United States Patent
Shimada et al.

(10) Patent No.: US 9,255,203 B2
(45) Date of Patent: Feb. 9, 2016

(54) WATER/OIL REPELLENT COMPOSITION, METHOD FOR ITS PRODUCTION AND ARTICLE

(71) Applicant: ASAHI GLASS COMPANY, LIMITED, Tokyo (JP)

(72) Inventors: Minako Shimada, Tokyo (JP); Eiji Morimoto, Tokyo (JP); Yuuichi Oomori, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 120 days.

(21) Appl. No.: 14/059,056

(22) Filed: Oct. 21, 2013

(65) Prior Publication Data

US 2014/0051805 A1 Feb. 20, 2014

Related U.S. Application Data

(63) Continuation of application No. PCT/JP2012/060882, filed on Apr. 23, 2012.

(30) Foreign Application Priority Data

Apr. 25, 2011 (JP) ................. 2011-097139

(51) Int. Cl.
| | | |
|---|---|---|
| *C08F 220/24* | (2006.01) | |
| *C09D 5/00* | (2006.01) | |
| *C08F 220/22* | (2006.01) | |
| *C09D 133/16* | (2006.01) | |
| *D06M 15/277* | (2006.01) | |
| *C09D 127/06* | (2006.01) | |

(52) U.S. Cl.
CPC ............... *C09D 5/00* (2013.01); *C08F 220/22* (2013.01); *C08F 220/24* (2013.01); *C09D 133/16* (2013.01); *D06M 15/277* (2013.01); *C09D 127/06* (2013.01)

(58) Field of Classification Search
CPC ..................................................... C08F 220/22
See application file for complete search history.

(56) References Cited

U.S. PATENT DOCUMENTS

| 6,180,740 B1 * | 1/2001 | Fitzgerald ..................... 526/245 |
| 2009/0325849 A1 * | 12/2009 | Gotz et al. ..................... 510/299 |
| 2012/0177832 A1 * | 7/2012 | Fuchs et al. ................... 427/387 |
| 2013/0149543 A1 * | 6/2013 | Yamane et al. ............... 428/421 |

FOREIGN PATENT DOCUMENTS

| EP | 2 423 292 A1 | 2/2012 |
| EP | 2 439 249 A1 | 4/2012 |
| JP | 03-243685 A | 10/1991 |
| JP | 03243685 A * | 10/1991 |
| JP | 07-229070 A | 8/1995 |
| JP | 09158045 A * | 6/1997 |
| JP | 2009-215370 A | 9/2009 |
| JP | 2010-100766 A | 5/2010 |
| WO | WO-2009/041648 A1 | 4/2009 |
| WO | WO-2010/047258 A1 | 4/2010 |
| WO | WO 2012020735 A1 * | 2/2012 |

OTHER PUBLICATIONS

Extended European Search Report issued in Application No. 12776575.8 dated Oct. 17, 2014.
International Preliminary Report on Patentability received in PCT/JP2012/060882 mailed on Nov. 7, 2013.
International Search Report received in PCT/JP2012/060882 dated Jul. 24, 2012.

* cited by examiner

*Primary Examiner* — Nicole M Buie-Hatcher
(74) *Attorney, Agent, or Firm* — Foley & Lardner LLP

(57) ABSTRACT

To provide a water/oil repellent composition with which an article which has favorable water/oil repellency and washing durability, and into which infiltration of a coating liquid can be suppressed, is obtained, and which presents a low environmental impact, its production method and an article having its surface treated with the composition. A water/oil repellent composition comprising a copolymer (X) having structural units based on the monomer (a) and structural units based on the monomer (b), and an aqueous medium, wherein the mass average molecular weight of the copolymer is at least 60,000, and the proportion of the structural units based on the monomer (a) is 60 to 95 mass %. Monomer (a): by $(Z-Y)_nX$, wherein Z is a e.g. $C_{1-6}$ polyfluoroalkyl group, Y is e.g. a bivalent organic group having no fluorine atom, n is 1 or 2, and X is a polymerizable unsaturated group. Monomer (b): vinyl chloride.

6 Claims, No Drawings

WATER/OIL REPELLENT COMPOSITION, METHOD FOR ITS PRODUCTION AND ARTICLE

TECHNICAL FIELD

The present invention relates to a water/oil repellent composition, a method for its production and an article having its surface treated with the water/oil repellent composition.

BACKGROUND ART

As a method for imparting water/oil repellency to the surface of an article (such as a fiber product), a method of treating the article by means of a water/oil repellent composition composed of an emulsion having, dispersed in an aqueous medium, a copolymer having structural units based on a monomer having a polyfluoroalkyl group (a polyfluoroalkyl group will be hereinafter referred to as a $R^f$ group) having at least 8 carbon atoms, has been known.

However, recently, EPA (US Environmental Protection Agency) has pointed out that a compound having a perfluoroalkyl group (a perfluoroalkyl group will be hereinafter referred to as a $R^F$ group) having at least 7 carbon atoms is likely to be decomposed in the environment or in the body, and the decomposition product is likely to be accumulated, i.e. it presents a high environmental impact. Therefore, a water/oil repellent composition comprising a copolymer which has structural units based on a monomer having a $R^F$ group having at most 6 carbon atoms, and has no structural units based on a monomer having a $R^F$ group having at least 7 carbon atoms, has been required.

As a water/oil repellent composition containing such a copolymer, the following water/oil repellent composition has been, for example, proposed (Patent Document 1).

A water/oil repellent composition comprising a copolymer having structural units based on the following monomer (a), structural units based on the following monomer (b) and structural units based on the following monomer (c), and an aqueous medium, in a molar ratio of structural units based on the monomer (b) to structural units based on the monomer (c) ((b)/(c)) of at least 1:

Monomer (a): A monomer having a $R^F$ group having at most 6 carbon atoms.

Monomer (b): Vinyl Chloride.

Monomer (c): A vinyl ether having no polyfluoroalkyl group and having a crosslinkable functional group.

An article having its surface treated with the water/oil repellent composition has favorable water repellency after drying without forcibly heating after washing (hereinafter referred to as washing durability). Here, on an article (a fiber product such as a sports wear) having its surface treated with the water/oil repellent composition, a moisture-permeable waterproofing film is provided on the rear side so as to impart a function to release water vapor by sweating from the body and a function to shut out the rain (Patent Document 2). As a method for producing such an article having a moisture-permeable waterproofing film, a lamination method or a coating method is well known.

The lamination method is a method of bonding a porous polyfluoroethylene film or a microporous polyurethane resin film to the rear side of an article treated with a water/oil repellent composition by means of e.g. an adhesive component. The coating method is a method of coating the rear side of an article treated with a water/oil repellent composition, with a coating liquid containing a polyurethane resin, an acrylic resin or the like. This article is required such that the resin film bonded or coated is not easily separated.

Further, as a medium contained in the coating liquid, in the case of dry coating of forming a resin film by drying after coating, it has been known to use a highly volatile solvent such as methyl ethyl ketone, ethyl acetate, toluene or isopropyl alcohol. On the other hand, in the case of wet coating of forming a resin film by coagulation in water, a polar organic solvent such as N,N-dimethylformamide (hereinafter referred to as DMF) is used.

However, since a moisture-permeable waterproofing film is formed on the rear side of an article treated with the water/oil repellent composition, if a coating liquid is applied, the coating liquid infiltrates into the surface of the article, and a resin film is formed even on the surface side of the article, and thus the design of the article may be impaired.

PRIOR ART DOCUMENTS

Patent Documents

Patent Document 1: WO2010/047258
Patent Document 2: JP-A-07-229070

DISCLOSURE OF INVENTION

Technical Problem

The object of the present invention is to provide an article which has favorable water/oil repellency and washing durability, into which infiltration of a coating liquid to form a moisture-permeable waterproofing film or the like is suppressed, and which is excellent in the design. Further, another object of the present invention is to provide a water/oil repellent composition which presents a low environmental impact, its production method and an article having its surface treated with the water/oil repellent composition.

Solution to Problem

The water/oil repellent composition of the present invention comprises a copolymer (X) having structural units based on the following monomer (a) and structural units based on the following monomer (b), and an aqueous medium, wherein the mass average molecular weight of the copolymer (X) is at least 60,000; and the proportion of the structural units based on the monomer (a) in the copolymer (X) is from 60 to 95 mass % based on the structural units (100 mass %) based on all the monomers constituting the copolymer (X):

monomer (a): a compound represented by the following formula (1):

$$(Z-Y)_n X \quad (1)$$

wherein Z is a $C_{1-6}$ polyfluoroalkyl group or a group represented by the following formula (2), Y is a bivalent organic group having no fluorine atom, or a single bond, n is 1 or 2, and X is, when n is 1, any one of the groups represented by the following formulae (3-1) to (3-5) and, when n is 2, any one of the groups represented by the following formulae (4-1) to (4-4):

$$C_i F_{2i+1} O(CFX^1 CF_2 O)_j CFX^2- \quad (2)$$

wherein i is an integer of from 1 to 6, j is an integer of from 0 to 10, and each of $X^1$ and $X^2$ is a fluorine atom or a trifluoromethyl group;

$$—CR=CH_2 \quad (3\text{-}1)$$

$$—C(O)OCR=CH_2 \quad (3\text{-}2)$$

$$—OC(O)CR=CH_2 \quad (3\text{-}3)$$

$$—OCH_2\text{-}\phi\text{-}CR=CH_2 \quad (3\text{-}4)$$

$$—OCH=CH_2 \quad (3\text{-}5)$$

wherein R is a hydrogen atom, a methyl group or a halogen atom, and $\phi$ is a phenylene group;

$$—CH[(CH_2)_mCR=CH_2]— \quad (4\text{-}1)$$

$$—CH[(CH_2)_mC(O)OCR=CH_2]— \quad (4\text{-}2)$$

$$—CH[(CH_2)_mOC(O)CR=CH_2]— \quad (4\text{-}3)$$

$$—OC(O)CH=CHC(O)O— \quad (4\text{-}4)$$

where R is a hydrogen atom, a methyl group or a halogen atom, and m is an integer of from 0 to 4;

monomer (b): vinyl chloride.

The copolymer (X) preferably further has structural units based on the following monomer (c):

monomer (c): a monomer having no polyfluoroalkyl group and having a crosslinkable functional group.

Further, the copolymer (X) preferably further has structural unites based on the following monomer (d):

monomer (d): a (meth)acrylate having no polyfluoroalkyl group and having a $C_{18\text{-}30}$ alkyl group.

The zeta potential of the copolymer (X) is preferably from 10 to 40 mV.

Further, the water/oil repellent composition of the present invention preferably contains the following copolymer (Y) having a zeta potential higher by from 10 to 60 mV than the zeta potential of the copolymer (X) and having a zeta potential of from 20 to 70 mV, in an amount of from 5 to 50 mass % based on the total amount of the copolymer (X) and the copolymer (Y);

copolymer (Y): a copolymer which has structural units based on the monomer (a) and which is the same as or different from the copolymer (X), of which the proportion of the structural units based on the monomer (a) is from 60 to 95 mass % based on the structural units (100 mass %) based on all the monomers constituting the copolymer.

Further, the copolymer (Y) is preferably a copolymer having structural units based on the monomer (a), structural units based on the monomer (b) and structural units based on the monomer (d):

The method for producing a water/oil repellent composition of the present invention is a method for producing a water/oil repellent composition, which comprises polymerizing monomer components comprising the monomer (a) and the monomer (b) in an aqueous medium in the presence of a surfactant and a polymerization initiator to produce an emulsion in which fine particles of a copolymer (X) having a mass average molecular weight (Mw) of at least 60,000 are emulsified in the aqueous medium, wherein the proportion of the monomer (a) in the monomer components is from 60 to 95 mass % based on the monomer components (100 mass %).

The monomer components preferably further include the above monomer (c) and/or the above monomer (d).

The zeta potential of the copolymer (X) in the emulsion of the copolymer (X) obtained by the method of the present invention is preferably from 10 to 40 mV.

Further, the method for producing a water/oil repellent composition of the present invention is preferably a production method wherein with the emulsion obtained by polymerization in the above production method, an emulsion containing fine particles of the above copolymer (Y) having a zeta potential higher by from 10 to 60 mV than the zeta potential of the copolymer (X) and having a zeta potential of from 20 to 70 mV, is blended in a proportion of from 5 to 50 mass % based on the total amount of the copolymer (X) and the copolymer (Y).

The emulsion containing fine particles of the copolymer (Y) is preferably an emulsion obtained by polymerizing monomer components comprising the monomer (a) and the monomer (b) in an aqueous medium in the presence of a surfactant and a polymerization initiator.

In the method for producing a water/oil repellent composition of the present invention, it is preferred that the emulsion containing fine particles of the copolymer (X) obtained by the above production method is blended and diluted with an aqueous medium.

The article of the present invention has its surface treated with the water/oil repellent composition of the present invention and thereby has a coating film of the polymer on its surface.

Advantageous Effects of Invention

According to the water/oil repellent composition of the present invention, it is possible to obtain an article which has favorable water/oil repellency and washing durability, into which infiltration of a coating liquid to form a moisture-permeable waterproofing film or the like can be suppressed, and which is excellent in the design. Further, the water/oil repellent composition of the present invention presents a low environmental impact.

According to the method for producing a water/oil repellent composition of the present invention, it is possible to produce a water/oil repellent composition with which it is possible to obtain an article which has favorable water/oil repellency and washing durability, into which infiltration of a coating liquid to form a moisture-permeable waterproofing film or the like can be suppressed, and which is excellent in the design, and which presents a low environmental impact.

The article of the present invention has favorable water/oil repellency and washing durability, and into which infiltration of a coating liquid to form a moisture-permeable waterproofing film or the like can be suppressed, and which is thereby excellent in the design, and presents a low environmental impact.

DESCRIPTION OF EMBODIMENTS

In this specification, a compound represented by the formula (1) will be referred to as a compound (1). Compounds represented by other formulae will also be referred to in the same manner. Further, in this specification, a group represented by the formula (2) will be referred to as a group (2). Groups represented by other formulae will also be referred to in the same manner. Further, a (meth)acrylate in this specification means an acrylate or a methacrylate. Further, in this specification, a monomer means a compound having a polymerizable unsaturated group. Further, in this specification, a $R^f$ group is a group having some or all of hydrogen atoms in an alkyl group substituted by fluorine atoms, and a $R^F$ group is a group having all the hydrogen atoms in an alkyl group substituted by fluorine atoms.

<Water/Oil Repellent Composition>

The water/oil repellent composition of the present invention comprises a specific copolymer (X) and an aqueous medium as essential components, and may further contain the after-mentioned copolymer (Y), a surfactant or an additive, as the case requires. The water/oil repellent composition of the present invention is preferably an emulsion in which fine particles of a specific polymer are stably dispersed in an aqueous medium, and usually contains a surfactant for the stable dispersion.

Further, the water/oil repellent composition of the present invention is preferably an emulsion obtained by polymerizing the monomers by emulsion polymerization in an aqueous medium, or an emulsion obtained by diluting the emulsion obtained by emulsion polymerization with an aqueous medium such as water. In the case of emulsion polymerization, polymerization is carried out in an aqueous medium containing a surfactant, and at least part of the surfactant in the water/oil repellent composition is the surfactant used at the time of the polymerization. The additive may be present in the aqueous medium at the time of emulsion polymerization like the surfactant, or may be added to the emulsion after emulsion polymerization.

(Copolymer (X))

The copolymer (X) has structural units based on a monomer (a) and structural units based on a monomer (b).

The copolymer (X) preferably further has structural units based on a monomer (c), and may further has structural units based on a monomer (d) and structural units based on a monomer (e), as the case requires. Further, the copolymer (X) more preferably further has structural units based on a monomer (c) and structural units based on a monomer (d) and as the case requires, may further have structural units based on a monomer (e).

Monomer (a):

The monomer (a) is a compound (1):

$$(Z-Y)_n X \quad (1)$$

Z is a $C_{1-6}$ $R^f$ group (provided that the $R^f$ group may contain an etheric oxygen atom) or a group (2):

$$C_i F_{2i+1} O(CFX^1 CF_2 O)_j CFX^2- \quad (2)$$

wherein i is an integer of from 1 to 6, j is an integer of from 0 to 10, and each of $X^1$ and $X^2$ which are independent of each other, is a fluorine atom or a trifluoromethyl group.

The $R^f$ group is preferably a $R^F$ group. The $R^f$ group may be linear or branched, and is preferably linear.

Z may, for example, be the following groups:

$F(CF_2)_4-$,
$F(CF_2)_5-$,
$F(CF_2)_6-$,
$(CF_3)_2 CF(CF_2)_2-$,
$C_k F_{2k+1} O[CF(CF_3)CF_2 O]_h - CF(CF_3)-$, etc.

wherein k is an integer of from 1 to 6, and h is an integer of from 0 to 10.

Y is a bivalent organic group having no fluorine atom or a single bond.

The bivalent organic group is preferably an alkylene group. The alkylene group may be linear or branched. The number of carbon atoms in the alkylene group is preferably from 2 to 6. The bivalent organic group may have $-O-$, $-NH-$, $-CO-$, $-S-$, $-SO_2-$, $-CD^1=CD^2-$ (wherein each of $D^1$ and $D^2$ which are independent of each other, is a hydrogen atom or a methyl group), etc.

Y may, for example, be the following groups.
$-CH_2-$,
$-CH_2 CH_2-$,
$-(CH_2)_3-$,
$-CH_2 CH_2 CH(CH_3)-$,
$-CH=CH-CH_2-$,
$-S-CH_2 CH_2-$,
$-CH_2 CH_2-S-CH_2 CH_2-$,
$-CH_2 CH_2-SO_2-CH_2 CH_2-$,
$-W-OC(O)NH-A-NHC(O)O-(C_p H_{2p})-$, etc.

wherein p is an integer of from 2 to 30.

A is a symmetric alkylene group having no branch, an arylene group or an aralkylene group and is preferably $-C_6 H_{12}-$, $-\phi-CH_2-\phi-$ or $-\phi-$ (wherein $\phi$ is a phenylene group).

W is any one of the following groups.
$-SO_2 N(R^1)-C_d H_{2d}-$,
$-CONHC_d H_{2d}-$,
$-CH(R^{F1})-C_e H_{2e}-$,
$-C_q H_{2q}-$ wherein $R^1$ is a hydrogen atom or a $C_{1-4}$ alkyl group, d is an integer of from 2 to 8, $R^{F1}$ is a $C_{1-6}$ perfluoroalkyl group, e is an integer of from 0 to 6, and q is an integer of from 1 to 20. $R^{F1}$ is preferably a $C_4$ or $C_6$ perfluoroalkyl group.

n is 1 or 2.

X is, when n is 1, any one of groups (3-1) to (3-5) and when n is 2, any one of groups (4-1) to (4-4):

$$-CR=CH_2 \quad (3-1)$$

$$-C(O)OCR=CH_2 \quad (3-2)$$

$$-OC(O)CR=CH_2 \quad (3-3)$$

$$-OCH_2-\phi-CR=CH_2 \quad (3-4)$$

$$-OCH=CH_2 \quad (3-5)$$

wherein R is a hydrogen atom, a methyl group or a halogen atom, and $\phi$ is a phenylene group.

$$-CH[(CH_2)_m CR=CH_2]- \quad (4-1)$$

$$-CH[(CH_2)_m C(O)OCR=CH_2]- \quad (4-2)$$

$$-CH[(CH_2)_m OC(O)CR=CH_2]- \quad (4-3)$$

$$-OC(O)CH=CHC(O)O- \quad (4-4)$$

wherein R is a hydrogen atom, a methyl group or a halogen atom, and m is an integer of from 0 to 4.

The above Z is preferably a $R^F$ group, Y is preferably an alkylene group, and n is preferably 1. In such a case, X is preferably any of the groups (3-3) to (3-5), more preferably the group (3-3). Further, the above R is preferably a hydrogen atom or a methyl group.

The compound (I) is preferably a (meth)acrylate having a $C_{4-6}$ $R^F$ group from the viewpoint of e.g. the polymerizability with other monomers, the flexibility of the coating film containing the copolymer (X), the adhesion of the copolymer (X) to an article, the dispersibility in an aqueous medium and efficiency of the emulsion polymerization.

The compound (I) is particularly preferably a compound wherein Z is a $C_{4-6}$ $R^F$ group, Y is a $C_{1-4}$ alkylene group, n is 1, and X is the group (3-3) (provided that R is a hydrogen atom or a methyl group).

Monomer (b):

The monomer (b) is vinyl chloride.

By having the structural units based on the monomer (b), the washing durability will be improved.

Monomer (c):

The monomer (c) is a monomer having no $R^f$ group and having a crosslinkable functional group.

By having structural units based on the monomer (c), the washing durability will further be improved.

The crosslinkable functional group is preferably a functional group having at least one bond selected from a covalent bond, an ionic bond and a hydrogen bond, or a functional group capable of forming a crosslinked structure by an interaction of such a bond. Otherwise, a compound having an active organic group or an element such as hydrogen or halogen in its molecule may be used.

Such a functional group is preferably a hydroxy group, an isocyanate group, a blocked isocyanate group, an alkoxysilyl group, an amino group, a N-alkoxymethylamide group, a silanol group, an ammonium group, an amide group, an epoxy group, an oxazoline group, a carboxy group, an alkenyl group, a sulfonic group or the like, particularly preferably a hydroxy group, a blocked isocyanate group, an amino group or an epoxy group.

The monomer (c) is preferably a (meth)acrylate, an acrylamide, a vinyl ether or a vinyl ester.

The monomer (c) may, for example, be the following compounds.

2-Isocyanatoethyl (meth)acrylate, 3-isocyanatopropyl (meth)acrylate, 4-isocyanatobutyl (meth)acrylate, a 2-butanoneoxime adduct of 2-isocyanatoethyl (meth)acrylate, a pyrazole adduct of 2-isocyanatoethyl (meth)acrylate, a 3,5-dimethylpyrazole adduct of 2-isocyanatoethyl (meth)acrylate, a 3-methylpyrazole adduct of 2-isocyanatoethyl (meth)acrylate, an ε-caprolactam adduct of 2-isocyanatoethyl (meth)acrylate, a 2-butanoneoxime adduct of 3-isocyanatopropyl (meth)acrylate, a pyrazole adduct of 3-isocyanatopropyl (meth)acrylate, a 3,5-dimethylpyrazole adduct of 3-isocyanatopropyl (meth)acrylate, a 3-methylpyrazole adduct of 3-isocyanatopropyl (meth)acrylate, an c-caprolactam adduct of 3-isocyanatopropyl (meth)acrylate, a 2-butanoneoxime adduct of 4-isocyanatobutyl (meth)acrylate, a pyrazole adduct of 4-isocyanatobutyl (meth)acrylate, a 3,5-dimethylpyrazole adduct of 4-isocyanatobutyl (meth)acrylate, a 3-methylpyrazole adduct of 4-isocyanatobutyl (meth)acrylate, an c-caprolactam adduct of 4-isocyanatobutyl (meth) acrylate.

Methoxymethyl (meth)acrylamide, ethoxymethyl (meth) acrylamide, butoxymethyl (meth)acrylamide, diacetone (meth)acrylamide, γ-methacryloyloxypropyl trimethoxysilane, trimethoxy vinyl silane, vinyl trimethoxysilane, dimethylaminoethyl (meth)acrylate, diethylaminoethyl (meth) acrylate, dimethylaminopropyl (meth)acrylate, (meth)acryloylmorpholine, (meth)acryloyloxyethyl trimethylammonium chloride, (meth)acryloyloxypropyl trimethylammonium chloride, (meth)acrylamideethyl trimethylammonium chloride, (meth)acrylamidepropyl trimethylammonium chloride.

t-Butyl (meth)acrylamide sulfonic acid, (meth)acrylamide, N-methyl (meth)acrylamide, N-methylol (meth)acrylamide, N-butoxymethyl (meth)acrylamide, glycidyl (meth) acrylate, 2-hydroxyethyl (meth)acrylate, 2-hydroxypropyl (meth)acrylate, 4-hydroxybutyl (meth)acrylate, 3-chloro-2-hydroxypropyl methacrylate, polyoxyalkylene glycol mono (meth)acrylate, (meth)acrylic acid, 2-(meth)acryloyloxyethyl succinic acid, 2-(meth)acryloyloxyhexahydrophthalic acid, 2-(meth)acryloyloxyethyl acid phosphate, allyl (meth) acrylate, 2-vinyl-2-oxazoline, a polycaprolactone ester of 2-vinyl-4-methyl-(2-vinyloxazoline)hydroxyethyl (meth) acrylate.

Tri(meth)allyl isocyanurate (T(M)AIC manufactured by Nippon Kasei Chemical Co., Ltd.), triallyl cyanurate (TAC manufactured by Nippon Kasei Chemical Co., Ltd.), phenyl glycidyl ether acrylate toluene diisocyanate urethane prepolymer (AT-600 manufactured by KYOEISHA CHEMICAL Co., Ltd.), 3-(methylethylketoxime)isocyanatomethyl-3,5,5-trimethylcyclohexyl(2-hydroxyethyl methacrylate) cyanate (TECHCOAT HE-6P manufactured by Kyoken Kasei), a polycaprolactone ester of hydroxyethyl (meth)acrylate (PLACCEL FA, FM series manufactured by Daicel Chemical Industries, Ltd.).

2-Chloroethyl vinyl ether, 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 4-hydroxycyclohexyl vinyl ether, hexamethylene glycol monovinyl ether, 1,4-cyclohexanedimethanol monovinyl ether, diethylene glycol monovinyl ether, triethylene glycol monovinyl ether, dipropylene glycol monovinyl ether, glycidyl vinyl ether, 2-aminoethyl vinyl ether, 3-aminopropyl vinyl ether, 2-aminobutyl vinyl ether, allyl vinyl ether, 1,4-butanediol divinyl ether, nonanediol divinyl ether, cyclohexanediol divinyl ether, cyclohexanedimethanol divinyl ether, triethylene glycol divinyl ether, trimethylolpropane trivinyl ether, pentaerythritol tetravinyl ether.

The monomer (c) is preferably a 3,5-dimethylpyrazole adduct of 2-isocyanatoethyl (meth)acrylate, a 2-butanoneoxime adduct of 2-isocyanatoethyl (meth)acrylate, 2-hydroxyethyl (meth)acrylate, N-methylol (meth)acrylamide, glycidyl (meth)acrylate, 3-chloro-2-hydroxypropyl methacrylate, a polycaprolactone ester of hydroxyethyl (meth) acrylate (PLACCEL FA or FM-series manufactured by Daicel Chemical Industries, Ltd.).

Monomer (d):

The monomer (d) is a (meth)acrylate having no $R^f$ group and having a $C_{18-30}$ alkyl group. The washing durability will further be improved when the alkyl group has at least 18 carbon atoms. When the alkyl groups has at most 30 carbon atoms, the melting point is relatively low, thus leading to easy handling.

The monomer (d) is preferably a (meth)acrylate having a $C_{18-30}$ alkyl group, more preferably stearyl (meth)acrylate or behenyl (meth)acrylate, particularly preferably stearyl (meth)acrylate.

Monomer (e):

The monomer (e) is a monomer other than the monomers (a), (b), (c) and (d).

The monomer (e) may, for example, be the following compounds.

(Meth)acrylates such as methyl (meth)acrylate, ethyl (meth)acrylate, propyl (meth)acrylate, n-butyl (meth)acrylate, t-butyl (meth)acrylate, i-butyl (meth)acrylate, cyclohexyl (meth)acrylate, 2-ethylhexyl (meth)acrylate, n-hexyl (meth)acrylate, benzyl (meth)acrylate, octyl (meth)acrylate, decyl methacrylate, 3-ethoxypropyl acrylate, methoxy-butyl acrylate, 2-ethylbutyl acrylate, 1,3-dimethylbutyl acrylate, 2-methylpentyl acrylate, isobornyl (meth)acrylate, dicyclopentanyl (meth)acrylate, dicyclopentenyl (meth)acrylate, aziridinylethyl (meth)acrylate, 2-ethylhexylpolyoxyalkylene (meth)acrylate, polyoxyalkylene di(meth)acrylate, a (meth) acrylate having silicone in its side chain, a (meth)acrylate having a urethane bond, a (meth)acrylate having a polyoxyalkylene chain having a $C_{1-4}$ alkyl group at its terminal, and an alkylene di(meth)acrylate.

Alkyl vinyl ethers such as methyl vinyl ether, ethyl vinyl ether, n-propyl vinyl ether, isopropyl vinyl ether, n-butyl vinyl ether, isobutyl vinyl ether, pentyl vinyl ether, 2-ethylhexyl vinyl ether, octadecyl vinyl ether, cyclohexyl vinyl ether and a halogenated alkyl vinyl ether.

Olefins such as vinyl acetate, vinyl propionate, ethylene, propylene, isoprene, butene, 1,4-butadiene, 1,3-butadiene, pentene, 2-methyl-1-butene, 1-hexene, cyclohexyl-1-pentene, 1-dodecene, 1-tetradecene, 2-methylpentene, 2,2-dimethylpentene, 2-methoxypropylene, styrene, α-methylstyrene, p-methylstyrene, hexylstyrene, octylstyrene and nonylstyrene.

Halogenated olefins other than vinyl chloride such as tetrafluoroethylene, hexafluoropropylene, chlorotrifluoroethylene, vinylidene fluoride and vinylidene chloride.

Unsaturated carboxylic acid esters such as a crotonic acid alkyl ester, a maleic acid alkyl ester such as diethyl maleate, dipropyl maleate or dioctyl maleate, a fumaric acid alkyl ester such as diethyl fumarate or dipropyl fumarate, a citraconic acid alkyl ester and a mesaconic acid alkyl ester.

Monomers other than the above, such as allyl acetate, N-vinylcarbazole, maleimide, N-methylmaleimide, vinylpyrrolidone, N,N-dimethyl (meth)acrylamide and an alkyl vinyl ketone.

The monomer (e) is preferably a (meth)acrylate such as cyclohexyl (meth)acrylate, isobornyl methacrylate, i-butyl (meth)acrylate or t-butyl (meth)acrylate, particularly preferably cyclohexyl (meth)acrylate.

As a combination of structural units based on monomers, from the viewpoint of the water/oil repellency and the washing durability, preferred is a combination of structural units based on the monomer (a): a (meth)acrylate having a $C_{4-6}$ $R^F$ group, structural units based on the monomer (b): vinyl chloride, structural units based on the monomer (c) and structural units based on the monomer (d): stearyl (meth)acrylate or behenyl (meth)acrylate.

The proportion of the structural units based on the monomer (a) is preferably from 60 to 95 mass %, more preferably from 60 to 90 mass %, particularly preferably from 65 to 90 mass %, based on the structural units (100 mass %) based on all the monomers from the viewpoint of the water/oil repellency and the washing durability.

The proportion of the structural units based on the monomer (b) is from 5 to 40 mass %, preferably from 10 to 40 mass %, particularly preferably from 10 to 35 mass % based on the structural units (100 mass %) based on all the monomers from the viewpoint of the water/oil repellency and the washing durability.

The proportion of the structural units based on the monomer (c) is preferably from 0 to 15 mass % based on the structural units (100 mass %) based on all the monomers, and from the viewpoint of the washing durability, it is more preferably from 0.1 to 15 mass %, particularly preferably from 0.1 to 10 mass %.

The proportion of the structural units based on the monomer (d) is preferably from 0 to 30 mass % based on the structural units (100 mass %) based on all the monomers, and from the viewpoint of the washing durability, it is more preferably from 1 to 25 mass %, particularly preferably from 5 to 25 mass %.

The proportion of the structural units based on the monomer (e) is preferably from 0 to 30 mass %, more preferably from 0 to 25 mass %, particularly preferably from 0 to 20 mass % based on the structural units (100 mass %) based on all the monomers.

In the present invention, the proportion of the structural units based on a monomer is obtained by the NMR analysis and the elemental analysis. In a case where it cannot be obtained by the NMR analysis and the elemental analysis, it may be calculated based on the charged amount of the monomer at the time of the production of a water/oil repellent composition.

The mass average molecular weight (Mw) of the copolymer (X) is at least 60,000, preferably at least 62,000, particularly preferably at least 65,000. Within the above range, infiltration of a coating liquid to form a moisture-permeable waterproofing film or the like applied to an article into the surface side can be suppressed. The mass average molecular weight (Mw) of the copolymer is preferably at most 500,000, particularly preferably at most 300,000 from the viewpoint of the film-forming property and the storage stability.

The number average molecular weight (Mn) of the copolymer (X) is preferably at least 18,000, particularly preferably at least 19,000. The number average molecular weight (Mn) of the copolymer is preferably at most 300,000, particularly preferably at most 150,000.

The mass average molecular weight (Mw) and the number average molecular weight (Mn) of the copolymer (X) are a molecular weight calculated as polystyrene, as measured by gel permeation chromatography (GPC), and specifically measured by the following method.

The copolymer (X) is dissolved in tetrahydrofuran (hereinafter referred to as THF) to obtain a 0.5 mass % solution, which is passed through a 0.2 μm filter to prepare a sample for analysis. With respect to the sample, the number average molecular weight (Mn) and the mass average molecular weight (Mw) are measured under the following conditions.

Measurement temperature: 23° C.,
Injected amount: 0.2 mL,
Outflow rate: 1 mL/min,
Eluent: THF.

In the water/oil repellent composition of the present invention, the zeta potential of fine particles of the copolymer (X) (hereinafter sometimes referred to as the zeta potential of the copolymer (X)) is preferably from 10 to 40 mV. The zeta potential may be measured by a measuring means such as an interface electrical conductivity measurement such as a streaming potential method, a microelectrophoresis method, a rotating diffraction grating method or a laser Doppler electrophoresis method.

The zeta potential of the copolymer (X) can be adjusted by the types and the composition of the structural units based on the respective monomers, the type and the blending amount of the surfactant in the polymerization medium in e.g. emulsion polymerization as described hereinafter, or the like. It may sometimes be adjusted by newly blending a surfactant with the emulsion obtained by polymerization.

(Aqueous Medium)

The aqueous medium may be water, or water containing a water-soluble organic solvent.

The water-soluble organic solvent may, for example, be tert-butanol, 3-methoxymethylbutanol, propylene glycol, dipropylene glycol, dipropylene glycol monomethyl ether or tripropylene glycol, and is preferably dipropylene glycol, tripropylene glycol or dipropylene glycol monomethyl ether.

In a case where the aqueous medium contains the water-soluble organic solvent, the content of the water-soluble organic solvent is preferably from 1 to 80 parts by mass, more preferably from 10 to 60 parts by mass per 100 parts by mass of water.

(Surfactant)

The water/oil repellent composition of the present invention usually contains a surfactant. This surfactant is necessary in order that fine particles of the copolymer (X) are stably dispersed in the aqueous medium. To produce an emulsion of the copolymer (X) obtained by polymerizing the monomers by emulsion polymerization in the aqueous medium, with the aqueous medium to be used for emulsion polymerization, a surfactant is blended. At least part of the surfactant in the water/oil repellent composition of the present invention is this surfactant used at the time of polymerization. Further, a surfactant may further be blended with the emulsion obtained by emulsion polymerization.

The surfactant may, for example, be a hydrocarbon type surfactant or a fluorinated surfactant, and each of which may, for example, be an anionic surfactant, a nonionic surfactant, a cationic surfactant, or an amphoteric surfactant. As the surfactant, from the viewpoint of the compatibility with additives, it is preferred to use a nonionic surfactant and an amphoteric surfactant in combination, and from the viewpoint of the adhesion to a substrate, it is preferred to use a nonionic surfactant alone or to use a nonionic surfactant and a cationic surfactant in combination.

The ratio of the nonionic surfactant to the cationic surfactant (nonionic surfactant/cationic surfactant) is preferably from 97/3 to 40/60 (mass ratio).

The nonionic surfactant is preferably at least one member selected from the group consisting of surfactants $s^1$ to $s^6$.

Surfactant $s^1$:

Surfactant $s^1$ is a polyoxyalkylene monoalkyl ether, a polyoxyalkylene monoalkenyl ether, a polyoxyalkylene monoalkapolyenyl ether or a polyoxyalkylene monopolyfluoroalkyl ether.

Surfactant $s^1$ is preferably a polyoxyalkylene monoalkyl ether, a polyoxyalkylene monoalkenyl ether or a polyoxyalkylene monopolyfluoroalkyl ether. As surfactant $s^1$, one type may be used alone, or two or more types may be used in combination.

As the alkyl, alkenyl, alkapolyenyl or polyfluoroalkyl group (hereinafter the alkyl, alkenyl, alkapolyenyl and polyfluoroalkyl groups may generally be referred to as a $R^s$ group), a $C_{4-26}$ group is preferred. The $R^s$ group may be linear or branched. The branched $R^s$ group is preferably a secondary alkyl group, a secondary alkenyl group or a secondary alkapolyenyl group. The $R^s$ group may have some or all of hydrogen atoms substituted by fluorine atoms.

A specific example of the $R^s$ group may, for example, be an octyl group, a dodecyl group, a tetradecyl group, a hexadecyl group, a stearyl group (an octadecyl group), a behenyl group (a docosyl group), an oleyl group (a 9-octadecenyl group), a heptadecylfluorooctyl group, a tridecylfluorohexyl group, a 1H,1H,2H,2H-tridecylfluorooctyl group or a 1H,1H,2H,2H-nonafluorohexyl group.

The polyoxyalkylene (hereinafter referred to as POA) chain is preferably a chain wherein at least two of a polyoxyethylene (hereinafter referred to as POE) chain and/or a polyoxypropylene (hereinafter referred to as POP) chain are linked. The POA chain may be a chain composed of one type of POA chain or a chain composed of two or more types of POA chains. When it is composed of two or more types of POA chains, the respective POA chains are preferably linked in a block form.

Surfactant $s_1$ is more preferably a compound ($s^{11}$).

$$R^{10}O[CH_2CH(CH_3)O]_s—(CH_2CH_2O)_rH \qquad (s^{11})$$

wherein $R^{10}$ is an alkyl group having at least 8 carbon atoms or an alkenyl group having at least 8 carbon atoms, r is an integer of from 5 to 50, and s is an integer of from 0 to 20. $R^{10}$ may be one wherein some of hydrogen atoms are substituted by fluorine atoms.

When r is at least 5, the surfactant becomes soluble in water and will be uniformly dissolved in an aqueous medium, whereby the penetrating property of the water/oil repellent composition to an article will be good. When r is at most 50, hydrophilicity will be suppressed, and the water repellency will be good.

When s is at most 20, the surfactant becomes soluble in water and will be uniformly dissolved in an aqueous medium, whereby the penetrating property of the water/oil repellent composition to an article will be good.

In a case where r and s are at least 2, the POE chains and the POP chains will be linked in a block form.

$R^{10}$ is preferably linear or branched.

r is preferably an integer of from 10 to 30.

s is preferably an integer of from 0 to 10.

The compound ($s^{11}$) may, for example, be the following compounds, whereby the POE chains and the POP chains are linked in a block form.

$C_{18}H_{37}O[CH_2CH(CH_3)O]_2—(CH_2CH_2O)_{30}H$,
$C_{18}H_{35}O—(CH_2CH_2O)_{30}H$,
$C_{16}H_{33}O[CH_2CH(CH_3)O]_5—(CH_2CH_2O)_{20}H$,
$C_{12}H_{25}O[CH_2CH(CH_3)O]_2—(CH_2CH_2O)_{15}H$,
$(C_8H_{17})(C_6H_{13})CHO—(CH_2CH_2O)_{15}H$,
$C_{10}H_{21}O[CH_2CH(CH_3)O]_2—(CH_2CH_2O)_{15}H$,
$C_6F_{13}CH_2CH_2O—(CH_2CH_2O)_{15}H$,
$C_6F_{13}CH_2CH_2O[CH_2CH(CH_3)O]_2—(CH_2CH_2O)_{15}H$,
$C_4F_9CH_2CH_2O[CH_2CH(CH_3)O]_2—(CH_2CH_2O)_{15}H$.

Surfactant $s^2$:

Surfactant $s^2$ is a nonionic surfactant made of a compound having at least one carbon-carbon triple bond and at least one hydroxy group in its molecule.

Surfactant $s^2$ is preferably a nonionic surfactant made of a compound having one carbon-carbon triple bond and one or two hydroxy groups in its molecule.

Surfactant $s^2$ may have a POA chain in its molecule. The POA chain may be a POE chain, a POP chain, a chain wherein a POE chain and a POP chain are randomly linked, or a chain wherein a POE chain and a POP chain are linked in a block form.

Surfactant $s^2$ is preferably compounds ($s^{21}$) to ($s^{24}$).

$$HO—C(R^{11})(R^{12})—C≡C—(CR^{13})(R^{14})—OH \qquad (s^{21})$$

$$HO-(A^1O)_u—C(R^{11})(R^{12})—C≡C—(R^{13})(R^{14})—(OA^2)_v—OH \qquad (s^{22})$$

$$HO—C(R^{15})(R^{16})—C≡C—H \qquad (s^{23})$$

$$HO-(A^3O)_w—C(R^{15})(R^{16})—C≡C—H \qquad (s^{24})$$

Each of $A^1$ to $A^3$ is an alkylene group.

Each of u and v is an integer of at least 0, and (u+v) is an integer of at least 1.

w is an integer of at least 1.

In a case where each of u, v and w is at least 2, each of $A^1$ to $A^3$ may be the same or different.

The POA chain is preferably a POE chain, a POP chain or a chain containing a POE chain and a POP chain. The number of repeating units of the POA chain is preferably from 1 to 50.

Each of $R^{11}$ to $R^{16}$ is a hydrogen atom or an alkyl group.

The alkyl group is preferably a $C_{1-12}$ alkyl group, more preferably a $C_{1-4}$ alkyl group. The alkyl group may, for example, be a methyl group, an ethyl group, a propyl group, a butyl group or an isobutyl group.

The compound ($s^{22}$) is preferably a compound ($s^{25}$):

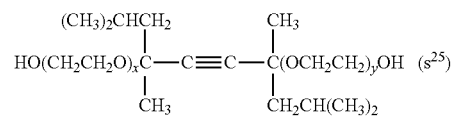

wherein each of x and y is an integer of from 0 to 100.

As the compound ($s^{25}$), one type may be used alone, or two or more types may be used in combination.

The compound ($s^{25}$) is preferably a compound wherein x and y are 0, a compound wherein the sum of x and y is from 1 to 4 on average, or a compound wherein the sum of x and y is from 10 to 30 on average.

Surfactant s³:

Surfactant s³ is a nonionic surfactant made of a compound wherein a POE chain and a POA chain having at least two oxyalkylenes having at least 3 carbon atoms continuously linked, are linked, and both terminals are hydroxy groups.

Such a POA chain is preferably polyoxybutene (hereinafter referred to as POB) and/or a POP chain.

Surfactant s³ is preferably a compound ($s^{31}$) or a compound ($s^{32}$):

$$HO(CH_2CH_2O)_{g1}(C_3H_6O)_t(CH_2CH_2O)_{g2}H \quad (s^{31})$$

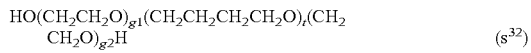

$$HO(CH_2CH_2O)_{g1}(CH_2CH_2CH_2CH_2O)_t(CH_2CH_2O)_{g2}H \quad (s^{32})$$

g1 is an integer of from 0 to 200.
t is an integer of from 2 to 100.
g2 is an integer of from 0 to 200.
When g1 is 0, g2 is an integer of at least 2. When g2 is 0, g1 is an integer of at least 2.

—$C_3H_6O$— may be —$CH(CH_3)CH_2$—, —$CH_2CH(CH_3)$—, or a mixture of —$CH(CH_3)CH_2$— and —$CH_2CH(CH_3)$—.

The POA chain is in a block-form.

Surfactant s³ may, for example, be the following compounds:

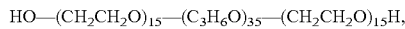

$$HO—(CH_2CH_2O)_{15}—(C_3H_6O)_{35}—(CH_2CH_2O)_{15}H,$$

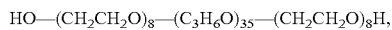

$$HO—(CH_2CH_2O)_8—(C_3H_6O)_{35}—(CH_2CH_2O)_8H,$$

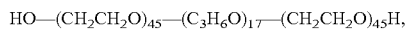

$$HO—(CH_2CH_2O)_{45}—(C_3H_6O)_{17}—(CH_2CH_2O)_{45}H,$$

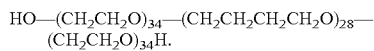

$$HO—(CH_2CH_2O)_{34}—(CH_2CH_2CH_2CH_2O)_{28}—(CH_2CH_2O)_{34}H.$$

Surfactant s⁴:

Surfactant s⁴ is a nonionic surfactant having an amine oxide moiety in its molecule. In the present invention, a surfactant having an amine oxide (N→O) is regarded as a nonionic surfactant.

Surfactant s⁴ is preferably a compound ($s^{41}$):

$$(R^{17})(R^{18})(R^{19})N(→O) \quad (s^{41})$$

Each of $R^{17}$ to $R^{19}$ is a monovalent hydrocarbon group.

As the compound ($s^{41}$), one type may be used alone, or two or more types may be used in combination.

The compound ($s^{41}$) is preferably a compound ($s^{42}$) from the viewpoint of the dispersion stability of the copolymer (A).

$$(R^{20})(CH_3)_2N(→O) \quad (s^{42})$$

$R^{20}$ is a $C_{6-22}$ alkyl group, a $C_{6-22}$ alkenyl group, a phenyl group having a $C_{6-22}$ alkyl group bonded thereto, a phenyl group having a $C_{6-22}$ alkenyl group bonded thereto, or a $C_{6-13}$ polyfluoroalkyl group. $R^{20}$ is preferably a $C_{8-22}$ alkyl group, a $C_{8-22}$ alkenyl group or a $C_{4-9}$ polyfluoroalkyl group.

The compound ($s^{42}$) may, for example, be the following compounds:

$$[H(CH_2)_{12}](CH_3)_2N(→O),$$

$$[H(CH_2)_{14}](CH_3)_2N(→O),$$

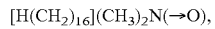

$$[H(CH_2)_{16}](CH_3)_2N(→O),$$

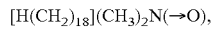

$$[H(CH_2)_{18}](CH_3)_2N(→O),$$

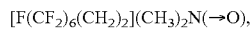

$$[F(CF_2)_6(CH_2)_2](CH_3)_2N(→O),$$

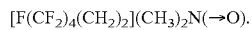

$$[F(CF_2)_4(CH_2)_2](CH_3)_2N(→O).$$

Surfactant s⁵:

Surfactant s⁵ is a nonionic surfactant made of a polyoxyethylene mono(substituted phenyl)ether or its condensate.

The substituted phenyl group is preferably a phenyl group substituted by a monovalent hydrocarbon group, more preferably a phenyl group substituted by an alkyl group, an alkenyl group or a styryl group.

Surfactant s⁵ is preferably a condensate of a polyoxyethylenemono(alkylphenyl) ether, a condensate of a polyoxethylenemono(alkenylphenyl)ether, a polyoxyethylenemono(alkylphenyl)ether, a polyoxyethylenemono(alkenylphenyl) ether or a polyoxyethylenemono[(alkyl)(styryl)phenyl]ether.

The polyoxyethylenemono(substituted phenyl)ether or its condensate may, for example, be a formaldehyde condensate of polyoxyethylenemono(nonylphenyl)ether, polyoxyethylenemono(nonylphenyl)ether, polyoxyethylenemono(octylphenyl)ether, polyoxyethylenemono(oleylphenyl)ether, polyoxyethylenemono[(nonyl)(styryl)phenyl]ether or polyoxyethylenemono[(oleyl)(styryl)phenyl]ether.

Surfactant s⁶:

Surfactant s⁶ is a nonionic surfactant made of a fatty acid ester of a polyol.

The polyol represents glycerol, sorbitan, sorbit, polyglycerin, polyethylene glycol, polyoxyethylene glyceryl ether, polyoxyethylenesorbitan ether or polyoxyethylenesorbit ether.

Surfactant s⁶ may be a 1:1 (molar ratio) ester of stearic acid and polyethylene glycol, a 1:4 (molar ratio) ester of an ether of sorbit with polyethylene glycol and oleic acid, a 1:1 (molar ratio) ester of an ether of polyoxyethylene glycol with sorbitan and stearic acid, a 1:1 (molar ratio) ester of an ether of polyethylene glycol with sorbitan and oleic acid, a 1:1 (molar ratio) ester of dodecanoic acid and sorbitan, a 1:1 or 2:1 (molar ratio) ester of oleic acid and decaglycerol, or a 1:1 or 2:1 (molar ratio) ester of stearic acid and decaglycerol.

Surfactant s⁷:

In a case where the surfactant contains a cationic surfactant, such a cationic surfactant is preferably surfactant s⁷.

Surfactant s⁷ is a cationic surfactant in a substituted ammonium salt form.

Surfactant s⁷ is preferably an ammonium salt having at least one hydrogen atom bonded to the nitrogen atom substituted by an alkyl group, an alkenyl group or a POA chain having a terminal hydroxy group, more preferably a compound ($s^{71}$):

$$[(R^{21})_4N^+]·X^- \quad (s^{71})$$

$R^{21}$ is a hydrogen atom, a $C_{1-22}$ alkyl group, a $C_{2-22}$ alkenyl group, a $C_{1-9}$ fluoroalkyl group or a POA chain having a terminal hydroxy group. Four $R^{21}$ may be the same or different, provided that the four $R^{21}$ are not simultaneously hydrogen atoms.

$R^{21}$ is preferably a $C_{6-22}$ long chain alkyl group, a $C_{6-22}$ long chain alkenyl group or a $C_{1-9}$ fluoroalkyl group.

In a case where $R^{21}$ is an alkyl group other than the long chain alkyl group, $R^{21}$ is preferably a methyl group or an ethyl group.

In a case where $R^{21}$ is a POA chain having a terminal hydroxy group, the POA chain is preferably a POE chain.

$X^-$ is a counter ion.

$X^-$ is preferably a chlorine ion, an ethylsulfuric acid ion or an acetic acid ion.

The compound ($s^{71}$) may, for example, be monostearyl trimethylammonium chloride, monostearyldimethylmonoethylammonium ethylsulfate, mono(stearyl)monomethyldi(polyethylene glycol) ammonium chloride, monofluorohexyl trimethylammonium chloride, di(beef tallow alkyl)dimethylammonium chloride or dimethylmonococonutamine acetate.

Surfactant $s^8$:

In a case where the surfactant contains an amphoteric surfactant, such an amphoteric surfactant is preferably surfactant $s^8$.

Surfactant $s^8$ is an alanine, an imidazolinium betaine, an amide betaine or an acetic acid betaine.

The hydrophobic group is preferably a $C_{6-22}$ long chain alkyl group, a $C_{6-22}$ long chain alkenyl group or a $C_{1-9}$ polyfluoroalkyl group.

Surfactant $s^8$ may, for example, be dodecyl betaine, stearyl betaine, dodecylcarboxymethylhydroxyethylimidazolinium betaine, dodecyldimethylaminoacetic acid betaine or a fatty acid amide propyldimethylaminoacetic acid betaine. Specific examples include a lauryl dimethylaminoacetic acid betaine aqueous solution (NIKKOL AM-301 manufactured by Nikko Chemicals Co., Ltd.), a coconut oil fatty acid amidopropyldimethylaminoacetic acid betaine solution (NIKKOL AM-3130N manufactured by Nikko Chemicals Co., Ltd.) and a sodium N-cocoyl-N-carboxymethyl-N-hydroxyethylethylenediamine aqueous solution (NIKKOL AM-101 manufactured by Nikko Chemicals Co., Ltd.).

Surfactant $s^9$:

Surfactant $s^9$ is a polymer surfactant made of a block copolymer or a random copolymer of a hydrophilic monomer with a hydrocarbon type hydrophobic monomer and/or a fluorinated hydrophobic monomer, or a hydrophobically modified product of a hydrophilic copolymer.

Surfactant $s^9$ may, for example, be a block or random copolymer of polyethylene glycol (meth)acrylate with a long chain alkyl acrylate, a block or random copolymer of polyethylene glycol (meth)acrylate with a fluoro(meth)acrylate, a block or random copolymer of vinyl acetate with a long chain alkyl vinyl ether, a block or random copolymer of vinyl acetate with a long chain alkyl vinyl ester, a polymer of styrene with maleic anhydride, a condensate of polyvinyl alcohol with stearic acid, a condensate of polyvinyl alcohol with stearyl mercaptan, a condensate of polyallylamine with stearic acid, a condensate of polyethyleneimine with stearyl alcohol, methylcellulose, hydroxypropyl methylcellulose or hydroxyethyl methylcellulose.

Commercial products of surfactant $s^9$ include, for example, MP polymer (Product No.: MP-103 or MP-203) manufactured by Kuraray corporation, SMA resins manufactured by Elf Atochem Inc, METOLOSE manufactured by Shin-Etsu Chemical Co., Ltd., EPOMIN RP manufactured by NIPPON SHOKUBAI Co., Ltd. and Surflon (Product No.: S-381 or S-393) manufactured by AGC Seimi Chemical Co., Ltd.

In a case where the medium is an organic solvent, or the mixing ratio of an organic solvent is large, surfactant $s^9$ is preferably surfactant $s^{91}$.

Surfactant $s^{91}$: A polymer surfactant made of a block copolymer or random copolymer of a lipophilic monomer with a fluorinated monomer (or its polyfluoroalkyl modified product).

Surfactant $s^{91}$ may, for example, be a copolymer of an alkyl acrylate with a fluoro(meth)acrylate, or a copolymer of an alkyl vinyl ether with a fluoroakyl vinyl ether.

Commercial products of surfactant $s^{91}$ include Surflon (Product No.: S-383 or SC-100 series) manufactured by AGC Seimi Chemical Co., Ltd.

As a combination of surfactants, from the viewpoint of the adhesion to a substrate and the stability of the obtained emulsion, preferred is a combination of surfactants $s^1$ and $s^2$, a combination of surfactants $s^1$ and $s^3$, a combination of surfactants $s^1$, $s^2$ and $s^3$, a combination of surfactants $s^1$ and/or $s^2$ and $s^7$, a combination of surfactants $s^1$, $s^3$ and $s^7$ or a combination of surfactants $s^1$, $s^2$, $s^3$ and $s^7$, and more preferred is the above combination wherein the surfactant $s^7$ is the compound ($s^{71}$). From the viewpoint of the compatibility with additives, preferred is a combination of surfactants $s^1$ and/or $s^2$ and $s^8$, or a combination of surfactants $s^1$, $s^2$, $s^3$ and $s^8$.

As the surfactant, it is preferred to use a surfactant having HLB of at most 12 in combination, in a case where the penetrating property to an article (such as a fiber product) is to be imparted. HLB is a value representing the degree of the affinity of a surfactant to water and oil, and is represented on a scale of from 0 to 20. A smaller value indicates lipophilicity, and a larger value indicates hydrophilicity. Several means have been proposed to calculate this value. For example, by the Griffin's method, it is defined as 20×the total formula weight of the hydrophilic portion/the molecular weight.

As surfactants having HLB of at most 12, the following are preferred.

Surfactant $s^1$: The compound ($s^{11}$) wherein s+r is an integer of from 2 to 10 (preferably from 3 to 8), and r is an integer of from 2 to 10 (preferably from 3 to 8).

Surfactant $s^2$: The compound ($s^{25}$) wherein x+y is at most 4.

Surfactant $s^6$: A sorbitan fatty acid ester, wherein the fatty acid has from 5 to 30 carbon atoms. Specific examples include polyoxyethylene 2 mol adduct oleyl ether (NIKKOL BO-2V manufactured by Nikko Chemicals Co., Ltd., HLB: 7.5), polyoxyethylene 7 mol adduct oleyl ether (NIKKOL BO-7V manufactured by Nikko Chemicals Co., Ltd., HLB: 10.5), polyoxyethylene 5 mol adduct behenyl ether (NIKKOL BB-5 manufactured by Nikko Chemicals Co., Ltd., HLB: 10.5), polyoxyethylene 4 mol adduct C12-15 alkyl ether (NIKKOL BD-4 manufactured by Nikko Chemicals Co., Ltd., HLB: 10.5), polyoxyethylene 1 mol polyoxypropylene 4 mol adduct cetyl ether (NIKKOL PBC-31 manufactured by Nikko Chemicals Co., Ltd., HLB: 9.5), 2,4,7,9-tetramethyl-5-decyne-4,7-diol ethylene oxide 3.5 mol adduct (Surfynol 440 manufactured by Nissin Chemical Industry Co., Ltd., HLB: 8), 2,4,7,9-tetramethyl-5-decyne-4,7-diol ethylene oxide 1.3 mol adduct (Surfynol 420 manufactured by Nissin Chemical Industry Co., Ltd., HLB: 4), 2,4,7,9-tetramethyl-5-decyne-4,7-diol (Surfynol 104 manufactured by Nissin Chemical Industry Co., Ltd., HLB: 4) and sorbitan palmitate (NONION PP-40R manufactured by NOF Corporation, HLB: 6.7).

The amount of the surfactant is preferably from 1 to 10 parts by mass, more preferably from 1 to 9 parts by mass, particularly preferably from 1 to 7 parts by mass based on the copolymer (100 parts by mass).

(Additives)

The additives include, for example, a penetrant, a defoamer, a water-absorbing agent, an antistatic agent, an antistatic polymer, an anticrease agent, a texture-adjusting agent, a softening agent, a fabric softener, a film-forming assistant, a water-soluble polymer (such as polyacrylamide or polyvinyl alcohol), a thermosetting agent (such as a melamine resin, a urethane resin, a triazine ring-containing compound or an isocyanate-type compound), an epoxy curing agent (such as isophthalic acid dihydrazide, adipic acid dihydrazide, sebacic acid dihydrazide, dodecanedioic acid dihydrazide, 1,6-hexamethylenebis(N,N-dimethylsemicarbazide), 1,1,1',1'-tetramethyl-4,4'-(methylene-di-p-phenylene) disemicarbazide or spiroglycol), a thermosetting catalyst, a crosslinking catalyst (such as an organic acid or ammonium chloride), a synthetic resin, a fiber-stabilizer and inorganic fine particles.

Further, the water/oil repellent composition of the present invention may contain a copolymer capable of exhibiting water repellency and/or oil repellency (e.g. a commercially available water repellent, a commercially available oil repellent, a commercially available water/oil repellent or a commercially available SR (soil release) agent) other than the above copolymer (X) or a water-repellent compound having no fluorine atom, as the case requires. The water-repellent compound having no fluorine atom may, for example, be a paraffin type compound, an aliphatic amide type compound, an alkylethylene urea compound or a silicone compound.

With the water/oil repellent composition of the present invention, fine particles of a copolymer which has a high zeta potential and which can develop water/oil repellency are preferably blended. This copolymer (hereinafter referred to as copolymer (Y)) is a copolymer which has structural units based on the monomer (a) and which is the same as or different from the copolymer (X), and of which the proportion of the structural units based on the monomer (a) in the copolymer (Y) is from 60 to 95 mass % based on the structural units based on all the monomers constituting the copolymer (Y). The zeta potential of the fine particles of the copolymer (Y) is from 20 to 70 mV and is higher by from 10 to 60 mV than the zeta potential of the copolymer (X) in the water/oil repellent composition with which the fine particles are blended (that is, the difference in the zeta potential between the copolymer (X) and the copolymer (Y) is from 10 to 60 mV, and the zeta potential of the copolymer (Y) is higher). The difference in the zeta potential is more preferably from 15 to 55 mV, particularly preferably from 20 to 50 mV.

It is considered that when the water/oil repellent composition of the present invention contains the copolymer (Y), a decrease in the adhesion of the particles by impurities can be prevented, and accordingly even when the above-described additive is added so as to improve the tear strength and the like for example, deterioration of the strike-through property when a moisture-permeable waterproofing film is formed can be suppressed.

(Copolymer (Y))

The copolymer (Y) may be a copolymer having a high zeta potential among the copolymers (X). As described above, the zeta potential of the copolymer (X) is preferably from 10 to 40 mV. Within such a range of the zeta potential, a combination of two or more copolymers (X) which achieve a difference in the zeta potential of at least 10 mV may be selected, and among them, the copolymer (X) having a higher zeta potential is regarded as the copolymer (Y). Further, the zeta potential of the copolymer (X) is not limited to from 10 to 40 mV, and accordingly the copolymer (X) having a zeta potential higher than 40 mV is regarded as the copolymer (Y) and combined with the copolymer (X) having a zeta potential of from 10 to 40 mV, to achieve a difference in the zeta potential between them of from 10 to 60 mV.

The copolymer (Y) may also be a copolymer having structural units based on the monomer (a) other than the copolymer (X). Even when the copolymer (Y) is a copolymer other than the copolymer (X), in the same manner as the copolymer (X), the proportion of the structural units based on the monomer (a) in the copolymer (Y) is from 60 to 95 mass % based on the structural units based on all the monomers constituting the copolymer (Y). The copolymer (Y) other than the copolymer (X) may, for example, be a copolymer having no structural units based on the monomer (b), or a copolymer having a mass average molecular weight less than 60,000.

The copolymer (Y) is a copolymer having structural units based on the monomer (a) and structural units based on at least one monomer selected from the above monomers (b) to (e).

The copolymer (Y) is preferably a copolymer having structural units based on the monomer (a) and structural units based on the monomer (b) in either case where it is the same copolymer as the copolymer (X) or different from the copolymer (X), and is more preferably a copolymer having structural units based on the monomer (a), structural units based on the monomer (b) and structural units based on the monomer (d).

Further, the copolymer (Y) is preferably a copolymer having a proportion of the structural units based on the monomer (a) higher than that of the copolymer (X) in the water/oil repellent composition with which it is blended, and even when the copolymer (X) has structural units based on the monomer (c), the copolymer (Y) is preferably a copolymer having no structural units based on the monomer (c). Further, in a case where the copolymer (Y) has structural units based on the monomer (d), the alkyl group of the monomer (d) is more preferably an alkyl group having a larger number of carbon atoms than a stearyl group, and is particularly preferably a behenyl group.

The mass average molecular weight (Mw) of the copolymer (Y) is preferably from 10,000 to 100,000, more preferably from 10,000 to 80,000.

The number average molecular weight (Mn) of the copolymer (Y) is preferably from 5,000 to 80,000, more preferably from 5,000 to less than 60,000.

In a case where the copolymer (Y) is a copolymer having structural units based on the monomer (a), structural units based on the monomer (b) and structural units based on the monomer (d), the proportion of the structural units based on the monomer (b) is more preferably from 1 to 30 mass %, particularly preferably from 1 to 25 mass % based on the structural units (100 mass %) based on all the monomers from the viewpoint of the adhesion to a substrate. The proportion of the structural units based on the monomer (d) is more preferably from 4 to 49 mass %, particularly preferably from 4 to 25 mass % based on the structural units (100 mass %) based on all the monomers with a view to improving the compatibility with the resin composition.

In a case where the water/oil repellent composition of the present invention contains the copolymer (Y), and the copolymer (Y) is a copolymer other than the copolymer (X), the content of the copolymer (Y) is preferably from 3 to 50 mass % based on the total mass of the copolymer (X) and the copolymer (Y). The content of the copolymer (Y) is more preferably from 5 to 45 mass % based on the total mass of the copolymer (X) and the copolymer (Y).

In a case where the copolymer (Y) is the same copolymer as the copolymer (X), they are both a copolymer belonging to the category of the copolymer (X) (the copolymer having a higher zeta potential is the copolymer (Y)), and accordingly the proportion of the copolymer (Y) is not particularly limited. However, in a case where the zeta potential of the copolymer (Y) exceeds 40 mV, the content of such a copolymer (Y) is preferably from 3 to 50 mass % based on the total mass of the copolymer (X) and the copolymer (Y). The content of the copolymer (Y) is more preferably from 5 to 45 mass % based on the total mass of the copolymer (X) and the copolymer (Y).

(Method for Producing Water/Oil Repellent Composition)

The water/oil repellent composition of the present invention is produced by the following method.

A method which comprises polymerizing monomer components comprising the monomer (a) and the monomer (b) and further including the monomer (c), the monomer (d) and the monomer (e) as the case requires, in an aqueous medium in the presence of a surfactant and a polymerization initiator to obtain a dispersion or emulsion of the copolymer (X), and adding the copolymer (Y), another medium, surfactant and additives, as the case requires.

The polymerization method may, for example, be a dispersion polymerization method, an emulsion polymerization method or a suspension polymerization method, and emulsion polymerization is preferred. Further, the polymerization method may be polymerization all at once or multistage polymerization.

The method for producing the water/oil repellent composition of the present invention is preferably a method wherein monomer components comprising the monomer (a) and the monomer (b) and further including the monomer (c), the monomer (d) and the monomer (e) as the case requires, are polymerized by emulsion polymerization in an aqueous medium in the presence of a surfactant and a polymerization initiator to obtain an emulsion in which fine particles of the copolymer (X) are emulsified in the aqueous medium or a method of adding the copolymer (Y), a medium, a surfactant or an additive to the emulsion obtained by the above method as the case requires.

With a view to improving the yield of the copolymer (X), it is preferred to pre-emulsify the mixture comprising the monomers, the surfactant and the aqueous medium, prior to the emulsion polymerization. For example a mixture comprising the monomers, the surfactant and the aqueous medium is mixed and dispersed by an ultrasonic stirring apparatus, a homomixer or a high pressure emulsifier.

(Polymerization Initiator)

The polymerization initiator may, for example, be a thermal polymerization initiator, a photopolymerization initiator, a radiation polymerization initiator, a radical polymerization initiator or an ionic polymerization initiator, and a water-soluble or oil-soluble radical polymerization initiator is preferred.

As the radical polymerization initiator, a common initiator such as an azo type polymerization initiator, a peroxide type polymerization initiator or a redox type initiator is employed depending upon the polymerization temperature. As the radical polymerization initiator, an azo type compound is particularly preferred, and in a case where polymerization is carried out in an aqueous medium, a salt of an azo type compound is more preferred. The azo type compound and the salt of an azo type compound may be 2,2'-azobis(4-methoxy-2,4-dimethylvaleronitrile), 2,2'-azobis(2,4-dimethylvaleronitrile), dimethyl 2,2'-azobis(2-methylpropionate), 2,2'-azobis(2-methylbutyronitrile), 2,2'-azobis(2-methylpropionamide) dihydrochloride, 2,2'-azobis[2-(2-imidazolin-2-yl)propane] disulfate, 2,2'-azobis[2-(2-imidazolin-2-yl)propane]dihydrochloride, 2,2'-azobis[2-(2-imidazolin-2-yl)propane]acetate, 2,2'-azobis[N-(2-carboxyethyl)-2-methylpropionamidine]hydrate or 2,2'-azobis(1-imino-1-pyrrolidino-2-methylpropane) dihydrochloride. The polymerization temperature is preferably from 20 to 150° C.

The amount of the polymerization initiator is preferably from 0.1 to 5 parts by mass, more preferably from 0.1 to 3 parts by mass, per 100 parts by mass of the monomer components.

(Molecular Weight-controlling Agent)

At the time of polymerization of the monomer components, a molecular weight-controlling agent may be employed. The molecular weight-controlling agent is preferably an aromatic compound, a mercapto alcohol or a mercaptan, particularly preferably an alkylmercaptan. The molecular weight-controlling agent may, for example, be a multifunctional mercapto compound such as mercaptoethanol, n-octylmercaptan, n-dodecylmercaptan, t-dodecylmercaptan, stearylmercaptan, thioglycerol, α-methylstyrene dimer ($CH_2$=$C(Ph)CH_2C(CH_3)_2Ph$ wherein Ph is a phenyl group), diethylene glycolbis(3-mercaptobutyrate), pentaerythritol tetrakis(3-mercaptobutyrate), 2,4,6-trimercaptotriazine, or 1,3,5-tris(3-mercaptobutyloxyethyl)-1,3,5-triazine-2,4,6 (1H,3H,5H)-trione.

The amount of addition of the molecular weight-controlling agent may be properly adjusted so that Mw and Mn of the copolymer (X) are within the above ranges. The amount of addition of the molecular weight-controlling agent is preferably from 0 to 1 part by mass, more preferably from 0 to 0.8 part by mass, particularly preferably from 0 to 0.6 part by mass per 100 parts by mass of the monomer components.

(Medium)

As the medium, the above-mentioned aqueous medium may be used. In a case where the medium is added after the dispersion or emulsion of the copolymer (X) is obtained, the medium may be the same as or different from the above-mentioned aqueous medium.

The proportion of the monomers (a) to (e) is the same as the proportion of the structural units based on the monomers (a) to (e) in the copolymer (X) since the monomers are polymerized substantially 100%, and the preferred embodiments are also the same.

The proportion of the monomers (a) to (e) in the copolymer (X) is the same as the proportion of the structural units based on the monomers (a) to (e) in the copolymer (X) since the monomers are polymerized substantially 100%, and the preferred embodiments are also the same.

The copolymer (Y) may be blended after a dispersion or emulsion of the copolymer (Y) is obtained by polymerizing monomer components comprising the monomer (a) and at least one monomer selected from the monomers (b) to (e) in an aqueous medium in the presence or the surfactant and the polymerization initiator, by adding the obtained dispersion or emulsion to the dispersion or emulsion of the copolymer (X). Particularly, it is preferred to blend the emulsion of the copolymer (Y).

The dispersion or emulsion of the copolymer (Y) may be produced by the same method as the method of producing the dispersion or emulsion of the copolymer (X).

In the water/oil repellent composition of the present invention, it is preferred that the copolymer (Y) is dispersed in the form of fine particles in the aqueous medium.

The average particle size of the copolymer (X) is preferably from 10 to 1,000 nm, more preferably from 10 to 300 nm, particularly preferably from 10 to 250 nm. When the average particle size is within such a range, it will be unnecessary to use a surfactant or the like in a large amount, the water repellency will be good, and when dyed cloths are treated, no color fading will result, and the dispersed particles can stably be present in the aqueous medium without precipitation. The average particle size of the copolymer can be measured by e.g. a dynamic light-scattering apparatus or an electron microscope.

When the copolymer (Y) is used, the average particle size of fine particles of the copolymer (Y) is also preferably within the same range as the average particle size of the fine particles of the copolymer (X).

Immediately after the production of the water/oil repellent composition, the solid content concentration of the emulsion is preferably from 20 to 40 mass % based on the emulsion (100 mass %). Here, the solid content concentration is a concentration including the surfactant in addition to the copolymer (X). The content of the copolymer (X) in the emulsion is preferably from 18 to 40 mass % immediately after the production of the water/oil repellent composition.

At the time of treating an article, the solid content concentration of the water/oil repellent composition of the present invention is preferably from 0.2 to 5 mass % based on the water/oil repellent composition (100 mass %).

The solid content concentration of the emulsion or the water/oil repellent composition is calculated from the mass of the emulsion or the water/oil repellent composition before heating and the mass after drying for 4 hours by a counter current canal dryer at 120° C.

(Effect and Function)

The water/oil repellent composition of the present invention as described in the foregoing, comprises the copolymer (X) which has structural units based on the monomer (a) and structural units based on the monomer (b), the proportion of the structural units based on the monomer (a) being from 60 to 95 mass % based on the structural units (100 mass %) based on all the monomers, whereby it is possible to impart sufficient water/oil repellency and washing durability to the surface of an article.

Further, in the water/oil repellent composition of the present invention, the mass average molecular weight of the copolymer (X) is at least 60,000, whereby it is possible to suppress infiltration of a coating liquid to form a moisture-permeable waterproofing film or the like. It is estimated that due to a high molecular weight of the copolymer (X), the molecular chains are entangled with one another, a uniform coating film will be formed, and gaps into which a solvent (such as DMF or toluene) of the coating liquid infiltrates are hardly formed, whereby infiltration can be suppressed.

Further, in the water/oil repellent composition of the present invention, each of the copolymer (X) and the copolymer (Y) has no structural units based on a monomer having a $R^F$ group having at least 7 carbon atoms, whereby the content (content in a case where the solid content concentration is 20%) of perfluorooctanoic acid (PFOA) and perfluorooctanesulfonic acid (PFOS), and their precursors and analogues, of which the effects on the environment are pointed out, can be reduced to a level of not higher than the detection limit as an analytical value of LC-MS/MS by the method disclosed in WO2009/081822.

<Article>

The article of the present invention is one having its surface treated with the water/oil repellent composition of the present invention.

Articles to be treated include, for example, fibers (natural fibers, synthetic fibers, mixed fibers, etc.), various fiber products, nonwoven fabrics, resins, paper, leather, metals, stones, concrete, gypsum and glass.

The treating method may, for example, be a method of coating an article with a coating liquid containing the water/oil repellent composition by a known coating method, followed by drying, or a method of dipping an article with a coating liquid containing the water/oil repellent composition, followed by drying.

Further, after treatment with the water/oil repellent composition of the present invention, antistatic finish, softening finish, antibacterial finish, deodorant finish or waterproofing finish may, for example, be carried out.

The waterproofing finish may be processing to provide a waterproofing film. The waterproofing film may, for example, be a porous film made of a urethane resin or an acrylic resin, a non-porous film made of a urethane resin or an acrylic resin, a polytetrafluoroethylene film or a moisture-permeable waterproofing film made of a combination thereof. The article of the present invention is preferably one having its surface treated with the water/oil repellent composition of the present invention and has the moisture-permeable waterproofing film formed thereon.

When a fiber product having its surface treated with the water/oil repellent composition of the present invention further has the moisture-permeable waterproofing film formed thereon, the peel strength of the moisture-permeable waterproofing film tends to be high, and separation of the resin film hardly occurs.

By treating an article by means of the water/oil repellent composition of the present invention, a coating film of the polymer is formed on the surface of the article, whereby water/oil repellency can be imparted to the article. Further, excellent adhesion to the substrate surface is achieved, and it is possible to impart the water/oil repellency even by curing at a low temperature. Further, it is possible to maintain the performance at the initial stage of the processing stably without substantial deterioration of the performance by abrasion or washing. Further, when paper is treated, it is possible to impart an excellent sizing property and water/oil repellency to the paper even under a low temperature drying condition. In a case where it is applied to the surface of a resin, glass or a metal, it is possible to form a water/oil repellent coating film which is excellent in the adhesion to the article and which is excellent in the film-forming property.

EXAMPLES

Now, the present invention will be described in detail with reference to Examples, but it should be understood that the present invention is by no means thereby restricted.

Examples 5, 6, 8, 9, 12, 13, 14 and 15 are Examples of the present invention, Examples 1 to 4 and 7 are Comparative Examples, and Examples 10 and 11 are Reference Examples.

<Physical Properties of Copolymer>

With respect to a copolymer recovered by the following recovery method, its molecular weight was measured.

(Recovery Method)

6 g of an emulsion was dropped into 60 g of 2-propanol (hereinafter referred to as IPA), followed by stirring to precipitate solid. After carrying out centrifugal separation at 3,000 rpm for 5 minutes, the obtained solid was separated. 12 g of IPA was again added, followed by thorough stirring. After carrying out centrifugal separation at 3,000 rpm for 5 minutes, the obtained solid was separated from the supernatant, followed by vacuum drying at 35° C. overnight to obtain a copolymer.

(Molecular Weight)

The recovered polymer was dissolved in THF to obtain a 1 mass % solution, which was passed through a 0.2 μm filter to obtain a sample for analysis. With respect to the sample, the number average molecular weight (Mn) and the mass average molecular weight (Mw) were measured. The conditions for the measurement were as follows.

Apparatus: HLC-8220GPC manufactured by TOSOH CORPORATION

Column: One having TSKgel MultiporerHXL-M connected in series.

Measuring temperature: 23° C.

Injected amount: 0.2 μL

Outflow rate: 1 mL/min

Standard sample: EasiCal PM-2 manufactured by Polymer Laboratories

Eluent: THF

<Evaluation for Water/Oil Repellency>
(Water Repellency)

With respect to a test cloth, the water repellency was evaluated in accordance with the spray test in JIS L1092-1992. The water repellency is represented by five grades of from 1 to 5. Here, the higher the grade number, the better the water repellency. One with grade 3 or higher is regarded as exhibiting water repellency. A grade having +(−) attached shows that the property is slightly better (worse) than the standard property of that grade. A score having two grades indicated with "−" shows that the property is in the middle of the two grades, and that the property is worse than the property of the higher grade having "−" attached and better than the property of the lower grade having "+" attached.

(Washing Durability)

With respect to a test cloth, washing was repeated 20 times or 50 times in accordance with the water washing method in JIS L0217 Appendix 103. After the washing, it was dried in air overnight in a room having a room temperature of 25° C. under a humidity of 60%, whereupon the water repellency was evaluated as described above.

(Oil Repellency)

With respect to a test cloth, the oil repellency was evaluated in accordance with the test method in AATCC-TM118-1966. The oil repellency is represented by grades shown in Table 1. A grade having +(−) attached shows that the property is slightly better (worse). A score having two grades indicated with "−" shows that the property is in the middle of the two grades, and that the property is worse than the property of the higher grade having "−" attached and better than the property of the lower grade having "+" attached.

TABLE 1

| Oil repellency No. | Test solution | Surface tension mN/m (25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of nujol/ 35 parts of hexadecane | 29.6 |
| 1 | Nujol | 31.2 |
| 0 | Less than 1 | — |

(Washing Durability)

With respect to a test cloth, washing was repeated 20 times in accordance with the water washing method in JIS L0217 Appendix 103. After the washing, it was dried in air overnight in a room having a room temperature of 25° C. under a humidity of 60%, whereupon the oil repellency was evaluated as described above.

<Applicability to Coating Liquid>
(DMF Repellency)

0.02 mL of DMF was placed on five positions on a test cloth. The time until DMF completely infiltrated into the test cloth was measured with an upper limit of 300 seconds to determine the average value. The time longer than 300 seconds indicates the best performance, and the shorter the time, the more the coating liquid is likely to infiltrate.

(Toluene Repellency)

0.02 mL of toluene was placed on five positions on a test cloth. The time until toluene completely infiltrated into the test cloth was measured with an upper limit of 300 seconds to determine the average value. The time longer than 300 seconds indicates the best performance, and the shorter the time, the more the coating liquid is likely to infiltrate.

(Peel Strength)

A heat seal tape was bonded to a test cloth by hot press. Using autograph AGS-X (manufactured by Shimadzu Corporation), the force (peel strength) applied when the 2.5 cm tape was peeled was measured. The higher the peel strength, the less the moisture-permeable waterproofing film or the like formed by the coating liquid is likely to be peeled.

(Strike-through Test)

As a resin composition, 100 g of RESAMINE LC4700 (manufactured by Dainichiseika Color & Chemicals Mfg. Co., Ltd.), 1.0 g of DURANATE TPA-100 (manufactured by Asahi Kasei Chemicals Corp.), 10 g of SEIKASEVEN BS-012 (manufactured by Dainichiseika Color & Chemicals Mfg. Co., Ltd.) and 50 g of dimethylformamide were mixed.

A test cloth subjected to water repellent processing was fixed to a bar coater (K303 MULTI COATER manufactured by RK Print Coat Instruments Ltd.) and coated with the above resin composition in a thickness of 1 μm using an applicator.

The test cloth was held for 2 minutes after coating and dipped in a water bath at 20° C. for 3 minutes. The excess water was squeezed out by a mangle roller, and the test cloth was passed through a tenter at 120° C. for 1 minute.

On the surface not coated with the resin composition, the difference in the chromaticness between a portion where the rear side was coated with the resin composition and a portion where the rear side was not coated was measured by MINOLTA CROMA METER CR300. The difference in the chromaticness was represented by ΔL, and the smaller the value, the smaller the discoloration and the better the results are.

(Tear Strength Test)

With respect to the test cloth coated with the resin composition in the above strike-through test, the tear strength was measured in accordance with L-1096 8.15.1 A-1 method (Single tongue method). The rate of pulling was 10 cm/min.

Abbreviations
(Monomer (a))
  C6FMA:$F(CF_2)_6CH_2CH_2OC(O)C(CH_3)=CH_2$
(Monomer (b))
  VCM: Vinyl chloride
(Monomer (c))
  D-BI: 3,5-Dimethylpyrazole adduct of 2-isocyanatoethyl (meth)acrylate
  HEMA: 2-Hydroxyethyl methacrylate
  NMAM: N-methylolacrylamide
(Monomer (d))
  STA: Stearyl acrylate
  BeMA: Behenyl methacrylate
(Monomer (e))
  CmFA: $F(CF_2)_mCH_2CH_2OC(O)CH=CH_2$ (a mixture wherein m is from 6 to 16, containing at least 99 mass % of ones wherein m is at least 8, and the average value of m is 9)
  CHMA: Cyclohexyl methacrylate
  iBoMA: Isobornyl methacrylate
  DOM: Dioctyl maleate
(Surfactant)
  PEO-20: 10 mass % aqueous solution of polyoxyethylene oleyl ether (Emulgen E430 manufactured by Kao Corporation, ethylene oxide about 26 mol adduct)
  SFY: 10 mass % aqueous solution of 2,4,7,9-tetramethyl-5-decyne-4,7diol ethylene oxide adduct (Surfynol 465 manufactured by Nissin Chemical Industry Co., Ltd., added moles of ethylene oxide: 10)

P204: 10 mass % aqueous solution of ethylene oxide propylene oxide polymer (PRONONE 204 manufactured by NOF Corporation, proportion of ethylene oxide: 40 mass %)

AMB: 10 mass % aqueous solution of lauryl dimethylaminoacetic acid betaine

TMAC: 10 mass % aqueous solution of stearyl trimethylammonium chloride (Molecular Weight-Controlling Agent)

nDoSH: n-Dodecylmercaptan (Polymerization Initiator)

VA-061: 10 mass % aqueous solution of acetate of 2,2'-azobis[2-(2-imidazolin-2-yl)propane]

V601: 10 mass % aqueous solution of 2,2'-azobis[2-(2-imidazolin-2-yl)propane]

(Medium)

DPG: Dipropylene glycol

Water: Deionized water

Example 1

Into a glass beaker, 107.7 g of C6FMA, 17.1 g of STA, 7.3 g of D-BI, 73.4 g of CHMA, 2.4 g of HEMA, 2.4 g of nDoSH, 75.9 g of PEO-20, 22.0 g of P-204, 22.0 g of TMAC, 73.4 g of DPG and 289.8 g of water were introduced, heated at 60° C. for 30 minutes and mixed by means of a homomixer (Biomixer manufactured by NIHONSEIKI KAISHA LTD.) to obtain a mixed liquid.

The obtained mixed liquid was treated at 40 MPa by means of a high pressure emulsifying machine (Mini Lab manufactured by APV Rannie) while maintaining the temperature at 60° C. to obtain an emulsified liquid. The obtained emulsified liquid was put into a stainless steel reactor and cooled to a temperature of at most 40° C. 19.6 g of VA061A was added, and the vapor phase was substituted by nitrogen, 36.7 g of VCM was introduced, and a polymerization reaction was carried out at 60° C. for 15 minutes with stirring, to obtain an emulsion of a copolymer. The solid content was 34.8%. The proportions of structural units based on the respective monomers, the amount of addition of the molecular weight-controlling agent, the molecular weight and the ζ potential are shown in Table 3.

The emulsion of a copolymer was diluted with water to adjust the solid content concentration to be 1.0 mass %, and a melamine resin crosslinking agent (BECKAMINE M3 manufactured by DIC Corporation) and an acid catalyst (BECKAMINE ACX manufactured by DIC Corporation) were added so that the respective concentrations became 0.3 mass %. Further, a blocked isocyanate crosslinking agent (MEIKANATE TP-10 manufactured by Meisei Chemical Works) was added so that its concentration became 1.0 mass %, an ammonium chloride 10 mass % aqueous solution was added so that its concentration became 5.0 mass %, and a 2,4,7,9-tetramethyl-5-decyne-4,7-diol ethylene oxide adduct (ethylene oxide 1.3 mol adduct, HLB: 4) was added so that its concentration became 1.0 mass % to obtain a water/oil repellent composition.

In the water/oil repellent composition, a base cloth (nylon high density taffeta) was dipped by a padding method, and squeezed so that the wet pickup became 60 mass %. This base cloth was heated at 110° C. for 90 seconds and at 170° C. for 60 seconds, and left in a room at 25° C. under a humidity of 60% overnight to prepare a test cloth. With respect to the test cloth, evaluation was carried out. The results are shown in Table 4.

Examples 2 to 9

An emulsion of a copolymer and a test cloth were obtained in the same manner as in Example 1 except that the charged amounts of the respective raw materials were as identified in Table 2. The proportions of structural units based on the respective monomers, the amount of addition of the molecular weight-controlling agent, the molecular weight and the ζ potential are shown in Table 3. The results of evaluation of the test cloth were shown in Table 4.

Example 10

An emulsion of a copolymer was obtained in the same manner as in Example 1 except that the charged amounts of the respective raw materials were as identified in Table 2. A test cloth was obtained in the same manner as in Example 1 except that only the melamine resin crosslinking agent and the acid catalyst in Example 1 were used as additives. The proportions of structural units based on the respective monomers, the proportions of the respective media and the ζ potential are shown in Table 3. The results of evaluation of the test cloth are shown in Table 4.

Example 11

Into a glass beaker, 221.7 g of C6FMA, 12.3 g of BeMA (VMA-70 manufactured by NOF Corporation), 2.5 g of nDoSH, 73.9 g of SFY, 9.9 g of TMAC, 24.6 g of DPG and 394.1 g of water were introduced, heated at 60° C. for 30 minutes and mixed by means of a homomixer (Biomixer manufactured by NIHONSEIKI KAISHA LTD.) to obtain a mixed liquid.

The obtained mixed liquid was treated at 40 MPa by means of a high pressure emulsifying machine (Mini Lab manufactured by APV Rannie) while maintaining the temperature at 60° C. to obtain an emulsified liquid. The obtained emulsified liquid was put into a stainless steel reactor and cooled to a temperature of at most 40° C. 0.7 g of V601 (manufactured by Wako Pure Chemical Industries, Ltd.) was added, and the vapor phase was substituted by nitrogen, 12.3 g of VCM was introduced, and a polymerization reaction was carried out at 65° C. for 15 hours with stirring, to obtain an emulsion of a copolymer. The solid content was 34.0%. The charged amounts of the raw materials are shown in Table 2, and the proportions of structural units based on the respective monomers, the addition amount of the molecular weight-controlling agent, the molecular weight and the ζ potential are shown in Table 3.

TABLE 2

| | Charge (g) | Ex. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (a) | C6FMA | 107.7 | 122.0 | 155.6 | 156.7 | 156.9 | 157.1 | 181.2 | 181.6 | 181.6 | | 221.7 |
| (e) | CmFA | | | | | | | | | | 179.7 | |
| (d) | STA | 17.1 | 36.6 | 17.0 | 17.1 | 17.2 | 17.2 | 17.1 | 17.2 | 17.2 | | |
| (d) | BeMA | | | | | | | | | | | 12.3 |
| (b) | VCM | 36.7 | 56.1 | 36.5 | 36.7 | 36.8 | 36.8 | 36.7 | 36.8 | 36.8 | 53.9 | 12.3 |

TABLE 2-continued

| Charge (g) | | 1 | 2 | 3 | 4 | 5 | 6 | 7 | 8 | 9 | 10 | 11 |
|---|---|---|---|---|---|---|---|---|---|---|---|---|
| (c) | D-BP | 7.3 | | 7.3 | 7.3 | 7.4 | 7.4 | 7.3 | 7.4 | 7.4 | | |
| (c) | HEMA | 2.4 | 2.4 | 2.4 | 2.4 | 2.5 | 2.5 | 2.4 | 2.5 | 2.5 | | |
| (e) | CHMA | 73.4 | | 24.3 | 24.5 | 24.5 | 24.5 | | | | | |
| (e) | iBoMA | | 24.4 | | | | | | | | | |
| (c) | NMAM | | 4.9 | | | | | | | | 6.9 | |
| (e) | DOM | | | | | | | | | | 16.2 | |
| — | PEO-20 | 75.9 | 75.6 | 75.4 | 75.9 | 76.0 | 76.1 | 75.9 | 76.1 | 76.1 | 92.4 | |
| — | SFY | | | | | | | | | | 20.5 | 73.9 |
| — | P204 | 22.0 | 22.0 | 21.9 | 22.0 | 22.1 | 22.1 | 22.0 | 22.1 | 22.1 | 25.7 | |
| — | AMB | | | | | | | | | 22.1 | | |
| — | TMAC | 22.0 | 22.0 | 21.9 | 22.0 | 22.1 | 22.1 | 22.0 | 22.1 | | | 9.9 |
| — | nDoSH | 2.4 | 2.4 | 7.3 | 2.4 | 1.2 | 0.5 | 2.4 | 0.5 | 0.5 | 2.6 | 2.5 |
| — | VA-061A | 19.6 | 19.5 | 19.5 | 19.6 | 19.6 | 19.6 | 19.6 | 19.6 | 19.6 | 20.5 | |
| | V601 | | | | | | | | | | | 0.7 |
| — | DPG | 73.4 | 73.2 | 73.0 | 73.4 | 73.6 | 73.6 | 74.4 | 74.6 | 74.6 | 77.0 | 24.6 |
| — | Water | 289.8 | 288.9 | 287.9 | 289.8 | 290.3 | 290.6 | 289.8 | 290.6 | 290.6 | 254.6 | 394.1 |
| Solid content (mass %) | | 34.8 | 35.0 | 35.2 | 34.8 | 34.7 | 34.6 | 34.8 | 34.7 | 34.6 | 36.1 | 34.0 |

TABLE 3

| Structural units | | | | | | Ex. | | | | | | |
|---|---|---|---|---|---|---|---|---|---|---|---|---|
| | (mass %) | 1 | 2 | 3 | 4 | 5 | 6 | 7 | 8 | 9 | 10 | 11 |
| (a) | C6FMA | 44 | 50 | 64 | 64 | 64 | 64 | 74 | 74 | 74 | | 90 |
| (e) | CmFA | | | | | | | | | | 70 | |
| (d) | STA | 7 | 15 | 7 | 7 | 7 | 7 | 7 | 7 | 7 | | |
| (d) | BeA | | | | | | | | | | | 5 |
| (b) | VCM | 15 | 23 | 15 | 15 | 15 | 15 | 15 | 15 | 15 | 21 | 5 |
| (c) | D-BP | 3 | | 3 | 3 | 3 | 3 | 3 | 3 | 3 | | |
| (c) | HEMA | 1 | 1 | 1 | 1 | 1 | 1 | 1 | 1 | 1 | | |
| (e) | CHMA | 30 | | 10 | 10 | 10 | 10 | | | | | |
| (e) | iBoMA | | 10 | | | | | | | | | |
| (c) | NMAM | | 2 | | | | | | | | 2.7 | |
| (e) | DOM | | | | | | | | | | 6.3 | |
| — | nDoSH | 1 | 1 | 3 | 1 | 0.5 | 0.2 | 1 | 0.2 | 0.2 | 1 | 1.0 |
| Mn | | | 12500 | 17400 | 35400 | 19600 | 12400 | 38500 | 43000 | | 26000 | |
| Mw | | | 36700 | 54500 | 66400 | 113900 | 36500 | 75800 | 95000 | | 43000 | |
| ζ potential (mV) | | 30 | 24 | 22 | 24 | 29 | 25 | 33 | 34 | 15 | 15 | 60 |

TABLE 4

| Evaluation | | | | | | Ex. | | | | | |
|---|---|---|---|---|---|---|---|---|---|---|---|
| | | 1 | 2 | 3 | 4 | 5 | 6 | 7 | 8 | 9 | 10 |
| Water repellency | Initial | 5− | 4 | 4 | 5− | 5− | 5− | 3+ | 5− | 5− | 5− |
| | 20 time washing | 2+ | 3 | 4− | 3− | 3+ | 4+ | 3− | 4 | 4− | 4+ |
| | 50 time washing | 2 | 2+ | 3 | 2+ | 2+ | 3+ | 2− | 3+ | 3 | 4− |
| Oil repellency | Initial | 2 | 3 | 3-4 | 3-4 | 3-4 | 3-4 | 2-3 | 4+ | 5− | 5+ |
| | 20 time washing | 0 | 2-3 | 3 | 2-3 | 2-3 | 2 | 2 | 3+ | 4+ | 4− |
| Coating applicability | DMF repellency (sec) | 25 | 30 | 1 | 50 | At least 300 | At least 300 | 18 | At least 300 | At least 300 | At least 300 |
| | Toluene repellency (sec) | | | 0 | 6 | 50 | 140 | | At least 300 | 160 | At least 300 |
| | Peel strength (N) | 5.3 | 14.6 | 10.6 | 6.7 | 7.7 | 5.9 | 8.0 | 7.5 | 7.3 | 4.4 |
| | Strike-through ΔL | 7 | 7 | 7 | 5 | 1 | 0.4 | — | 0.3 | 0.5 | — |

Examples 12 to 16

The emulsions of a copolymer obtained in Examples 8 and 11 were mixed and diluted in a proportion as identified in Table 5 so that the total solid content concentration became 1.2%. Further, a silicone fabric softener KB1000 (Meisilicone KB-1000 manufactured by Meisei Chemical Works) was added in a proportion as identified in Table 5. The results of evaluation of the performance are shown in Table 6.

TABLE 5

| | Proportion % | | |
|---|---|---|---|
| | Ex. 8 | Ex. 11 | KB1000 |
| Ex. 12 | 100 | 0 | 0.7% |
| Ex. 13 | 80 | 20 | 0.7% |
| Ex. 14 | 60 | 40 | 0.7% |
| Ex. 15 | 50 | 50 | 0.7% |

TABLE 6

| | | Ex. 8 | Ex. 12 | Ex. 13 | Ex. 14 | Ex. 15 |
|---|---|---|---|---|---|---|
| Evaluation of resin coating | Peel strength (N) | 8 | 3 | 5 | 5 | 3 |
| | Strike-through ΔL | 0.3 | 1.1 | 0.6 | 0.6 | 0.3 |
| | Tear strength (N) | 8 | 18 | 18 | 20 | 23 |
| Water/oil repellency | Water repellency/ initial | 4-5 | 4 | 4-5 | 4-5 | 4-5 |
| | Water repellency/ HL20 | 4 | 2 | 3 | 3 | 3 |
| | Oil repellency/ initial | 4 | 2+ | 3 | 3 | 3 |
| | Oil repellency/ HL20 | 2+ | 2− | 2 | 2 | 2− |

In a case where KB1000 was added, the tear strength of the processed fabric is improved. On the other hand, ΔL tends to be high, and the peel strength tends to be low. By adding the emulsion in Example 11 having a high ζ potential, ΔL can be made low, whereby both the strike-through property at the time of resin coating and the water/oil repellency can be satisfied.

Industrial Applicability

The water/oil repellent composition of the present invention is useful as a water/oil repellent agent for e.g. fiber products (clothing (sportswears, coats, jumpers, work clothes, uniforms, etc.), bags, industrial materials, etc.), non-woven fabrics, leather products, stone materials, concrete building materials, etc. Further, it is useful as a coating agent for filtration material or as a surface protective agent. Further, it is useful also for an application wherein it is mixed with e.g. polypropylene or nylon, followed by molding or forming into fibers to impart water/oil repellency.

This application is a continuation of PCT Application No. PCT/JP2012/060882, filed on Apr. 23, 2012, which is based upon and claims the benefit of priority from Japanese Patent Application No. 2011-097139 filed on Apr. 25, 2011. The contents of those applications are incorporated herein by reference in its entirety.

What is claimed is:

1. A method for producing a water and/or oil repellent composition, which comprises polymerizing monomer components comprising the following monomer (a) and the following monomer (b) in an aqueous medium in the presence of a surfactant and a polymerization initiator to produce an emulsion in which fine particles of a copolymer (X) having a mass average molecular weight of at least 60,000 are emulsified in the aqueous medium, wherein the proportion of the monomer (a) in the monomer components is from 60 to 95 mass % based on the monomer components (100 mass %):

monomer (a): a compound represented by the following formula (1):

$$(Z-Y)_n X \qquad 1$$

wherein Z is a $C_{1-6}$ polyfluoroalkyl group or a group represented by the following formula (2), Y is a bivalent organic group having no fluorine atom, or a single bond, n is 1 or 2, and X is, when n is 1, any one of the groups represented by the following formulae (3-1) to (3-5) and, when n is 2, any one of the groups represented by the following formulae (4-1) to (4-4):

$$C_iF_{2i+1}O(CFX^1 CF_2O)_j CFX^2— \qquad (2)$$

wherein i is an integer of from 1 to 6, j is an integer of from 0 to 10, and each of $X^1$ and $X^2$ is a fluorine atom or a trifluoromethyl group;

$$—CR=CH_2 \qquad (3\text{-}1)$$

$$—C(O)OCR=CH_2 \qquad (3\text{-}2)$$

$$—OC(O)CR=CH_2 \qquad (3\text{-}3)$$

$$—OCH_2\text{-}\phi\text{-}CR=CH_2 \qquad (3\text{-}4)$$

$$—OCH=CH_2 \qquad (3\text{-}5)$$

wherein R is a hydrogen atom, a methyl group or a halogen atom, and φ is a phenylene group;

$$—CH[—(CH_2)_m CR=CH_2]— \qquad (4\text{-}1)$$

$$—CH[—(CH_2)_m C(O)OCR=CH_2]— \qquad (4\text{-}2)$$

$$—CH[—(CH_2)_m OC(O)CR=CH_2]— \qquad (4\text{-}3)$$

$$—OC(O)CH=CHC(O)— \qquad (4\text{-}4)$$

where R is a hydrogen atom, a methyl group or a halogen atom, and m is an integer of from 0 to 4;

monomer (b): vinyl chloride, and wherein, with the emulsion obtained by polymerization, an emulsion containing fine particles of copolymer (Y) having a zeta potential higher by from 10 to 60 mV than the zeta potential of the copolymer (X) and having a zeta potential of from 20 to 70 mV, is blended in a proportion of from 5 to 50 mass % based on the total amount of the copolymer (X) and the copolymer (Y)

wherein copolymer (Y) is a copolymer which has structural units based on the monomer (a) and which is the same as or different from the copolymer (X), of which the proportion of the structural units based on the monomer (a) is from 60 to 95 mass % based on the structural units (100 mass %) based on all the monomers constituting the copolymer.

2. The production method according to claim 1, wherein the monomer components further include the following monomer (c):

monomer (c): a monomer having no polyfluoroalkyl group and having a crosslinkable functional group.

3. The production method according to claim 1, wherein the monomer components further include the following monomer (d):

monomer (d): an alkyl (meth)acrylate having no polyfluoroalkyl group and having a $C_{18-30}$ alkyl group.

4. The production method according to claim 1, wherein the zeta potential of the copolymer (X) in the emulsion obtained by polymerization is from 10 to 40 mV.

5. The production method according to claim 1, wherein the emulsion containing fine particles of the copolymer (Y) is an emulsion obtained by polymerizing monomer components comprising the monomer (a) and the monomer (b) in an aqueous medium in the presence of a surfactant and a polymerization initiator.

6. The production method according to claim 1, wherein the emulsion containing fine particles of the copolymer (X) is blended and diluted with an aqueous medium.

* * * * *